April 13, 1965  C. GIBSON ETAL  3,178,228
DUMPING HAND CART

Filed March 19, 1963  2 Sheets-Sheet 1

INVENTORS
CALVIN GIBSON,
ALBERT J. ALLINOT,
BY

McMorrow, Berman + Davidson
ATTORNEYS.

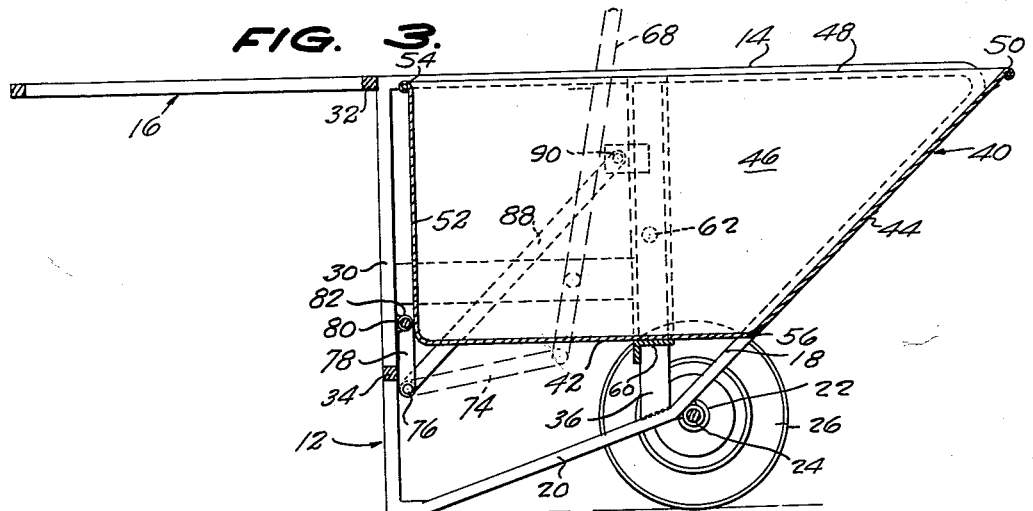
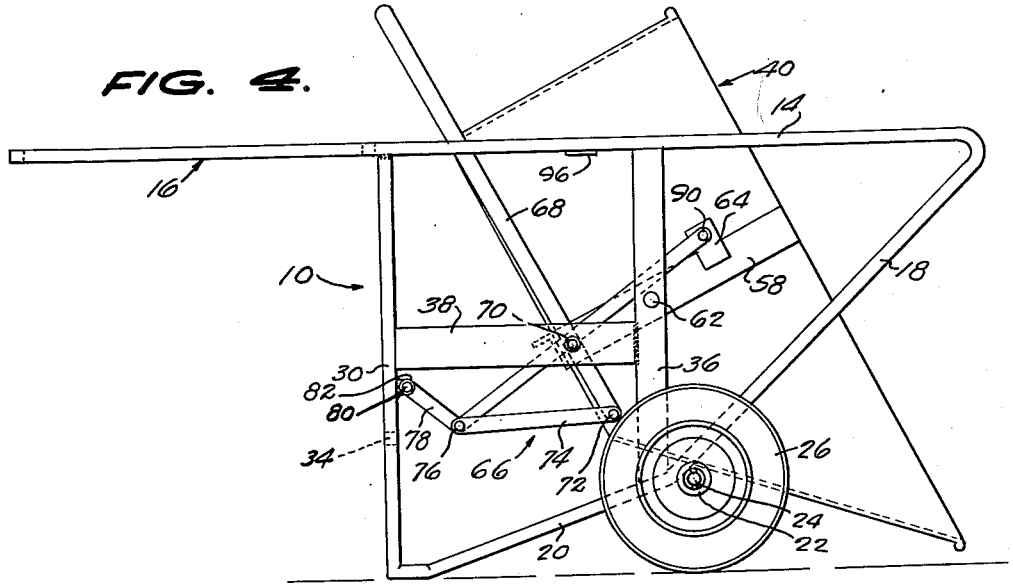
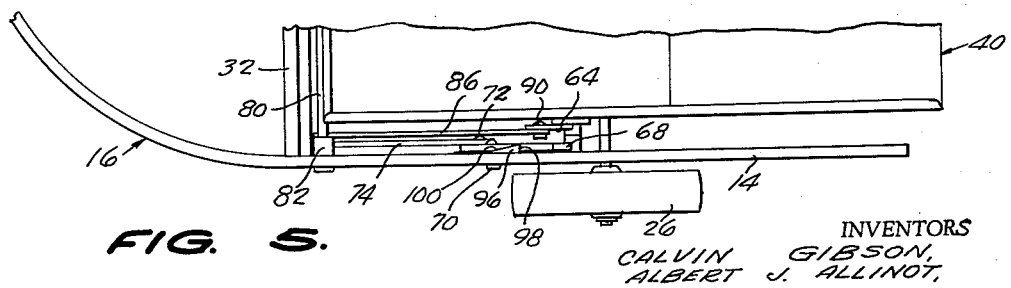

United States Patent Office

3,178,228
Patented Apr. 13, 1965

3,178,228
DUMPING HAND CART
Calvin Gibson, Rte. 1, Sumas, Wash., and Albert Joseph
Allinot, Abbottsford, British Columbia, Canada
Filed Mar. 19, 1963, Ser. No. 266,386
6 Claims. (Cl. 298—2)

This invention relates to a novel two-wheeled dumping hand cart.

The primary object of the invention is the provision of a simple, practical, and efficient cart of the kind indicated, especially but not exclusively for carrying and controllable dumping of cement on construction projects, as well as the handling of other fluid, semi-fluid, and comminuted materials, where accuracy and ease of dumping or spilling of the contents of the cart in restricted areas is of importance.

Another object of the invention is the provision of a cart of the character indicated above, which has a pivoted hopper which is gravitationally over-balanced in carrying position, and a hand lever, pivoted on the frame of the cart and connected through linkage to the hopper, for manually tilting the hopper forwardly from carrying position toward dumping position and return, and for controlling the movement of the hopper toward full dumping position, against the resistance of gravity, so as to enable controlling the speed and volume of dumping or spilling of material, between slow or gradual dumping of material and fast and complete dumping thereof.

A further object of the invention is the provision, in a cart of the character indicated above, of linkage for the hand lever which has components which, in the carrying position of the hopper, are over-center and serve to retain the hopper in this position, in addition to the force of gravity; and releasable locking means for the hand lever on the frame, which precludes unwanted dumping of the hopper should the retaining action of the force of gravity and the over-center linkage components be accidentally upset, as when wheeling the cart over irregular surfaces.

A still further object of the invention is the provision of a cart of the character indicated above, which is composed of a small number of uncomplex and easily assembled parts, and which can be manufactured in rugged and serviceable forms, at relatively low cost.

Other important objects and advantageous features of the invention will be apparent from the following description and the accompanying drawings, wherein, for purposes of illustration only, a specific form of the invention is set forth in detail.

In the drawings—

FIGURE 3 is a vertical longitudinal section taken on the line 3—3 of FIGURE 1;

FIGURE 4 is a right-hand side elevation, showing the hopper in full dumping position; and FIGURE 5 is an enlarged fragmentary top plan view of the cart.

Figure 1:
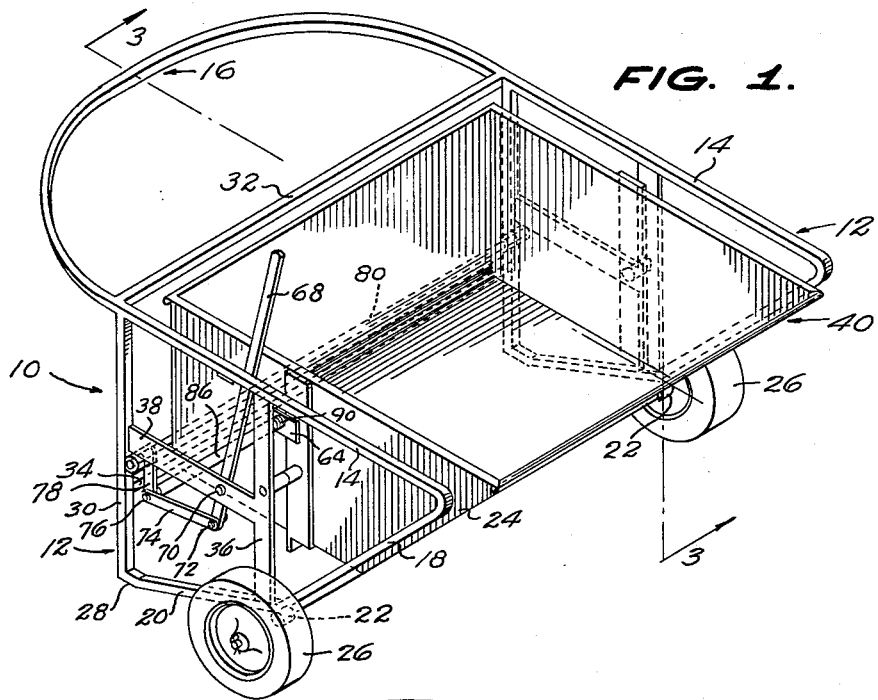
FIGURE 1 is a front perspective view of a cart of the present invention, showing its hopper secured in load carrying position.
Figure 2:
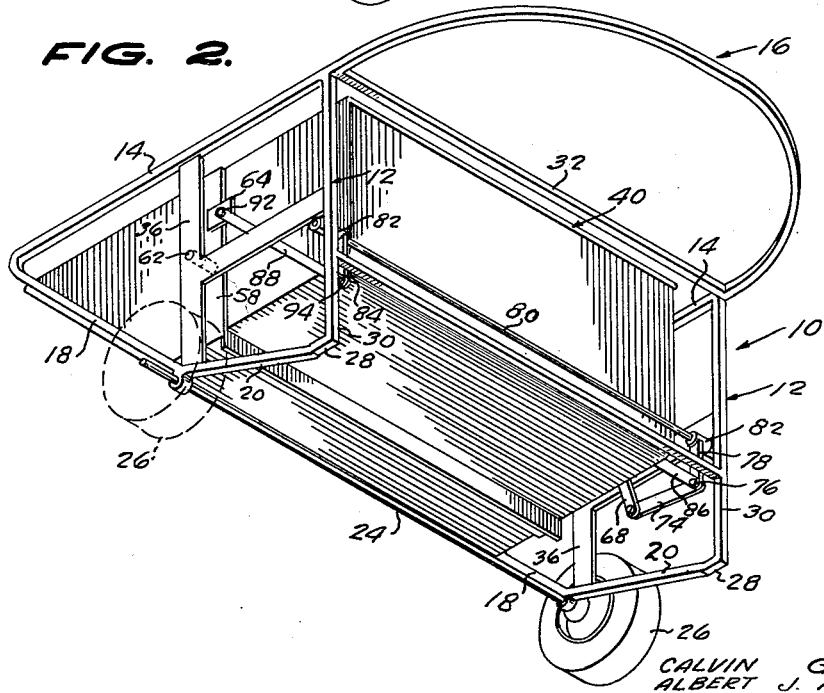
FIGURE 2 is a bottom perspective view of FIGURE 1.

Referring in detail to the drawings, wherein like numerals designate like parts throughout the several views, the illustrated cart comprises a frame 10 having similar generally triangular parallel spaced sides 12. The sides 12 are composed of normally horizontal straight top bars 14, which have joined to their rear ends a semi-circular horizontal handle bar 16. At their forward ends, the top bars 14 merge into downwardly and rearwardly angled bars which include forward or upper portions 18 and lower or rear portions 20, the latter being disposed at a smaller angle to the top bars than the portions 18. At the undersides of the meeting points of the portions 18 and 20 are journal lugs 22 through which extends an axle 24, carrying ground-engaging wheels 26 outside of the frame sides 12.

The lower or rear portions 20 of the angled bars have short horizontal rest portions 28, on their rear ends, which serve as rests adapted to bear upon the ground for supporting the frame 10 in a horizontal position when not being moved over the ground.

The rest portions 28 merge, at their rear ends, into upstanding perpendicular rear bars 30 which, at their upper ends, are secured to the undersides of the frame side top bars 14 where the handle bar 16 joins the latter. A transverse upper brace bar 32 extends between and is fixed at the same points. A lower transverse brace bar 34 extends between and is fixed to the rear bars 30, on a level spaced above the rest portions 28 and below the mid-height points of the bars 30.

Perpendicular relatively wide hopper supporting bars 36 are suitably fixed, at their upper ends, to the undersides of the frame side top bars 14, substantially at their midlength points, and at their lower ends, to the upper sides of the rear portions 20 of the angle bars of the frame sides, immediately behind the journal lugs 22. Horizontal longitudinal relatively wide brace bars 38 are fixed, at their rear ends, to the forward sides of the rear bars 30, substantially at the mid-height points thereof, and, at their forward ends to the rear sides of the perpendicular brace bars 36.

The illustrated cart further comprises a hopper 40, which is positioned between the frame sides 12, having a bottom wall which is composed of a flat normally horizontal rear portion 42 and a forwardly inclined forward portion 44. The inclined forward portion 44 is longer than the rear portion 42 to provide the hopper with an inherent forward and downward gravity bias. The hopper 40 has parallel side walls 46 having upper edges 48 which are normally horizontal and extend to the upper edge 50 of its bottom wall, and a perpendicular back wall 52 whose upper edge 54 is flush with the upper edges of the side walls. The meeting of the upper and lower portions of the bottom wall is curved, as indicated at 56, as the meetings of the bottom wall with the back wall 52, and with the side walls 46 so as to eliminate material collecting corners in the hopper.

The hopper side walls 46 have suitably fixed to their laterally outward sides, relatively wide perpendicular reinforcing bars 58, which extend downwardly from the upper edges of the side walls and have their lower ends secured to the ends of an angle iron cross bar 60 which is fixed to the underside of the rear portion 42 of the bottom wall of the hopper, at a location spaced rearwardly from and near to the forward end of the portion 42. The reinforcing bars 58 have laterally outwardly extending pintles 62 fixed thereto, which are equally spaced from the forward and rear edges of the bars 58, and which are located below and near to the mid-height points of the bars 58, and hence of the hopper 40, and behind the midlength point of the hopper. The pintles 62 are journaled through the frame side perpendicular hopper supporting bars 36. The bars 58 have fixed, on their laterally outward sides, rearwardly extending horizontal lugs 64, which are located substantially midway between the pintles 62 and the top of the hopper 40.

An over-center lever assembly, generally designated 66, is provided, which serves as manual means for moving the hopper 40 forwardly out of its horizontal load-carrying position far enough toward its dumping position that gravity can take over and operate to move the hopper to full dumping position, shown in FIGURE 4. The lever assembly 66 also serves as manual means for returning the hopper to its load-carrying position and retaining the same therein, retention of the hopper in its load-carrying position being assisted by gravity.

The lever assembly 62 comprises a vertically elongated hand lever 68, which extends above the frame 10, and which is pivoted, as indicated at 70, to the right-hand horizontal frame side brace bar 38, at a location close to the lower end of the hand lever 68, and at a point on the brace bar 38 near to and spaced rearwardly from the related perpendicular supporting bar 36, so that the hand lever extends below the horizontal brace bar 38.

At its lower end, the hand lever 68 is pivoted, as indicated at 72, to the forward end of an elongated link 74, which declines rearwardly at a slight angle to the horizontal, and is pivoted, at its rear end, as indicated at 76, to the outer side of and at the lower end of a shorter pendant and normally perpendicular right-hand lever 78. The link 78 is fixed on a transverse shaft 80 which is journaled through forwardly extending lugs 82 on the rear frame side bars, at locations between the horizontal frame side brace bars 30 and the lower frame cross bar 34. A companion and similar pendant left-hand lever 84 is fixed on the shaft 80 adjacent to its left-hand end. Relatively long forwardly inclined right-hand and left-hand links 86 and 88, are pivoted at their upper or forward ends, as indicated at 90 and 92 respectively, to the outer sides of the right and left-hand lugs on the perpendicular side wall reinforcing bars 58 of the hopper 40. The left-hand link 88 is pivoted, at its lower end, as indicated at 94, to the lower end of the left-hand pendant lever 84. The right-hand link 86 is pivoted, at its lower end, to the pivot 76, connecting the right-hand link 74 and the right-hand pendant lever 78.

A stop block 96 is fixed to the laterally inward side of the right-hand horizontal frame side top bar 14, at a location near to and spaced rearwardly from the adjacent perpendicular brace hopper supporting bar 36. The stop block 96, as shown in FIGURE 5, has a squared forward end 98, against which the hand lever 68 is adapted to bear, in the load-carrying position of the hopper 40, and has a forwardly and laterally inwardly angle cam surface 100, on its laterally inward side. The hand lever 68 normally bears against the laterally inward side of the top bar 14, so that the hand lever must be manually flexed inwardly in order to clear the stop block 96 and permit the hand lever to be moved rearwardly beyond the stop block for moving the hopper 40 from its load-carrying position, forwardly and downwardly toward a dumping position. When the hand lever 68 is moved forwardly from behind the stop block 96, the cam surface 100 serves to cam the hand lever inwardly until it passes the stop block and snaps out again and engages the frame side top bar 14, in front of the forward end 98 of the stop block.

In this position, the hand lever, as shown in FIGURES 1 and 3, is in a slightly forwardly angled over-center position, relative to the perpendicular, and the pendant levers 78 and 84 are in perpendicular positions and bear against the forward sides of the lower cross bar 34 of the frame 10, as shown in FIGURES 1 and 3, and the links 86 and 88 are in forwardly inclined positions, so that the linkage assembly 66 is locked against accidental operation and retains the hopper 40 in its load-carrying position, assisted by the rearwardly acting weight of the hopper.

In operation, the hopper 40 being in its load-carrying position and containing a load of material, dumping of the material is accomplished simply by disengaging the hand lever 68 from the stop block 96 and pulling the same rearwardly. This unlocks the linkage assembly 62 and tilts the hopper 40 forwardly beyond its center of gravity, so that gravity takes over and moves the hopper downwardly toward its full dumping position, shown in FIGURE 4. However, where it is desired to control the speed and volume of material dumped from the hopper, the operator of the cart maintains his grip on the hand lever and limits the movement of the hopper toward its full dumping position to the extent needed to obtain the desired speed and volume of dumping of the material.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A dumping hand cart comprising a frame having sides, outboard ground-engaging wheels mounted to the sides, said frame having an open forward end, and having ground engaging rests spaced rearwardly from the wheels and disposed on a level with the undersides of the wheels, a hopper disposed in the frame between the sides of the frame and pivoted to the frame sides at a location spaced rearwardly from the center of gravity of the hopper whereby the hopper is forwardly overbalanced to swing from a normal horizontal position to a forward dumping position, and manual means on the frame connected to the hopper for returning the hopper from dumping position to normal position, said manual means comprising an over-center link and lever assembly having a manual operating lever, and a lateral stop lug on the frame with which the hand lever is rearwardly engageable in a rearward locking position of the hand lever.

2. A dumping hand cart comprising a frame having sides, outboard ground-engaging wheels mounted to the sides, said frame having an open forward end, and having ground-engaging rests spaced rearwardly from the wheels and disposed on a level with the undersides of the wheels, and a hopper disposed in the frame between the sides of the frame, said frame having a rearwardly extending transverse handle rod, said hopper being pivoted to the frame sides at a location spaced rearwardly from the center of gravity of the hopper whereby the hopper is forwardly overbalanced to swing from a normal horizontal position to a forward dumping position, and manual means on the frame and connected to the hopper for returning the hopper from dumping position to normal position, and releasably locking the hopper in its normal position, said manual means comprising a normally horizontal link having rear and forward ends, a short vertical link pivoted at its lower end to the rear end of the horizontal link and pivoted at its upper end to the frame, a vertically elongated hand lever pivoted intermediate its ends on the frame at a location above said horizontal link and spaced forwardly from said short link, said hand lever being pivoted at its lower end to the forward end of the horizontal link, and a forwardly inclined long link pivoted at its lower end to the pivot connected to the horizontal and short vertical link, said long link being pivoted at its upper end to the hopper at a location spaced above the pivotal axis of the hopper.

3. A dumping hand cart comprising a frame having sides, outboard ground-engaging wheels mounted to the sides, said frame having an open forward end, and having ground-engaging rests spaced rearwardly from the wheels and disposed on a level with the undersides of the wheels, and a hopper disposed in the frame between the sides of the frame, said frame having a rearwardly extending transverse handle rod, said hopper being pivoted to the frame sides at a location spaced rearwardly from the center of gravity of the hopper whereby the hopper is forwardly overbalanced to swing from a normal horizontal position to a forward dumping position, and manual means on the frame and connected to the hopper for returning the hopper from dumping position to normal position and releasably locking the hopper in its normal position, said manual means comprising an over-center link and lever assembly having a manual operating lever, and a lateral stop lug on the frame with which the hand lever is rearwardly engageable in a rearward locking position of the hand lever, the hand lever being movable around the stop lug toward its forward release position.

4. A dumping hand cart comprising an open front frame having sides and a back, ground-engaging wheels on the sides adjacent to the forward end of the frame, a handlebar extending rearwardly from an upper part of the frame back, a hopper disposed between the frame sides, said hopper having a bottom wall composed of a horizontal rear portion and a forwardly-inclined forward portion, a perpendicular back wall and sidewalls, said forward portion of the bottom wall being longer than the rear portion of the bottom wall, the hopper sidewalls having laterally outwardly-extending pintles thereon, said pintles located behind the center of gravity of the hopper and below the mid-height point of the hopper, said pintles being journaled on the frame sides at locations behind the ground-engaging wheels, an over-center linkage assembly connected to a frame side and to the hopper, said assembly comprising a vertical hand lever, said assembly being adapted to occupy an over-center locked position with the hopper in a horizontal load-carrying position and with the hand lever in a forward position for retaining the hopper in this position, the hand lever being adapted to be moved to a rear position for releasing the hopper from its load-carrying position and tilting the hopper forwardly and downwardly to a forwardly overbalanced position from which the hopper is adapted to move gravitationally down to its dumping position, said hand lever being pivoted on the side frame at a location below and behind the pintles, and above the bottom wall of the hopper, and at a point adjacent to and spaced from the lower end of the hand lever, said linkage assembly comprising a transverse shaft journaled across the back of the frame on a level below the pivotal point of the hand lever, said shaft having pendant levers adjacent its ends, forwardly inclined links pivoted at their lower ends to the lower ends of the pendant links and pivoted at their upper ends to the hopper side walls at locations above and behind the pintles, said hand lever being located at and normally bearing against the laterally inward side of one of the frame sides, and a generally horizontal link pivoted at its forward end to the lower end of the hand lever and pivoted at its rear end to the lower end of the related pendant link.

5. A dumping hand cart comprising an open front frame having sides and a back, ground-engaging wheels on the sides adjacent to the forward end of the frame, a handlebar extending rearwardly from an upper part of the frame back, a hopper disposed between the frame sides, said hopper having a bottom wall composed of a horizontal rear portion and a forwardly-inclined forward portion, a perpendicular back wall and sidewalls, said forward portion of the bottom wall being longer than the rear portion of the bottom wall, the hopper sidewalls having laterally outwardly-extending pintles thereon, said pintles located behind the center of gravity of the hopper and below the mid-height point of the hopper, said pintles being journaled on the frame sides at locations behind the ground-engaging wheels, an over-center linkage assembly connected to a frame side and to the hopper, said assembly comprising a vertical hand lever, said assembly being adapted to occupy an over-center locked position with the hopper in a horizontal load-carrying position and with the hand lever in a forward position for retaining the hopper in this position, the hand lever being adapted to be moved to a rear position for releasing the hopper from its load-carrying position and tilting the hopper forwardly and downwardly to a forwardly overbalanced position from which the hopper is adapted to move gravitationally down to its dumping position, said hand lever being pivoted on the side frame at a location below and behind the pintles, and above the bottom wall of the hopper, and at a point adjacent to and spaced from the lower end of the hand lever, said linkage assembly comprising a transverse shaft journaled across the back of the frame on a level below the pivotal point of the hand lever, said shaft having pendant levers adjacent its ends, forwardly inclined links pivoted at their lower ends to the lower ends of the pendant links and pivoted at their upper ends to the hopper side walls at locations above and behind the pintles, said hand lever being located at and normally bearing against the laterally inward side of one of the frame sides, and a generally horizontal link pivoted at its forward end to the lower end of the hand lever and pivoted at its rear end to the lower end of the related pendant link, and releasable locking means on said one frame side for holding the hand lever in its forward position.

6. A dumping hand cart comprising an open front frame having sides and a back, ground-engaging wheels on the sides adjacent to the forward end of the frame, a handlebar extending rearwardly from an upper part of the frame back, a hopper disposed between the frame sides, said hopper having a bottom wall composed of a horizontal rear portion and a forwardly-inclined forward portion, a perpendicular back wall and sidewalls, said forward portion of the bottom wall being longer than the rear portion of the bottom wall, the hopper sidewalls having laterally outwardly-extending pintles thereon, said pintles located behind the center of gravity of the hopper and below the mid-height point of the hopper, said pintles being journaled on the frame sides at locations behind the ground-engaging wheels, an over-center linkage assembly connected to a frame side and to the hopper, said assembly comprising a vertical hand lever, said assembly being adapted to occupy an over-center locked position with the hopper in a horizontal load-carrying position and with the hand lever in a forward position for retaining the hopper in this position, the hand lever being adapted to be moved to a rear position for releasing the hopper from its load-carrying position and tilting the hopper forwardly and downwardly to a forwardly overbalanced position from which the hopper is adapted to move gravitationally down to its dumping position, said hand lever being pivoted on the side frame at a location below and behind the pintles, and above the bottom wall of the hopper, and at a point adjacent to and spaced from the lower end of the hand lever, said linkage assembly comprising a transverse shaft journaled across the back of the frame on a level below the pivotal point of the hand lever, said shaft having pendant levers adjacent its ends, forwardly inclined links pivoted at their lower ends to the lower ends of the pendant links and pivoted at their upper ends to the hopper side walls at locations above and behind the pintles, said hand lever being located at and normally bearing against the laterally inward side of one of the frame sides, and a generally horizontal link pivoted at its forward end to the lower end of the hand lever and pivoted at its rear end to the lower end of the related pendant link, and releasable locking means on said one frame side for holding the hand lever in its forward position, said hand lever being flexible toward and away from said one side, said locking means comprising a stop block having a squared forward end with which the hand lever is adapted to engage in its forward position, said block having a forwardly and laterally inwardly angled cam surface adapted to cam the hand lever inwardly to pass the stop block as the hand lever is moved forwardly from a position behind the stop block to its forward position.

References Cited by the Examiner

UNITED STATES PATENTS

| 1,797,471 | 3/31 | Jones | 298—5 X |
| 2,738,223 | 3/56 | Metailler | 298—19 |

FOREIGN PATENTS 748,279   4/56   Great Britain.

MILTON BUCHLER, *Primary Examiner.*

RALPH D. BLAKESLEE, *Examiner.*